(12) United States Patent
Brütt et al.

(10) Patent No.: US 11,577,702 B2
(45) Date of Patent: Feb. 14, 2023

(54) DEVICE AND METHOD FOR DECELERATING A VEHICLE HAVING A FRONT-LOADING DEVICE

(71) Applicant: WABCO Europe BVBA, Brussels (BE)

(72) Inventors: Mirko Brütt, Ronnenberg (DE); Dennis Sabelhaus, Rinteln (DE)

(73) Assignee: ZF CV Systems Global GmbH, Bern (CH)

( * ) Notice: Subject to any disclaimer, the term of this patent is extended or adjusted under 35 U.S.C. 154(b) by 319 days.

(21) Appl. No.: 16/893,698

(22) Filed: Jun. 5, 2020

(65) Prior Publication Data

US 2020/0391709 A1 Dec. 17, 2020

(30) Foreign Application Priority Data

Jun. 13, 2019 (DE) ............. 10 2019 116 086.3

(51) Int. Cl.
*B60T 8/17* (2006.01)
*B60T 8/171* (2006.01)
(Continued)

(52) U.S. Cl.
CPC ......... *B60T 8/1701* (2013.01); *B60T 8/171* (2013.01); *B60T 8/172* (2013.01); *B60T 8/176* (2013.01);
(Continued)

(58) Field of Classification Search
CPC ...... E02F 9/2083; B60T 8/1701; B60T 8/171; B60T 8/172; B60T 8/176; B60T 8/1862;
(Continued)

(56) References Cited

U.S. PATENT DOCUMENTS 5,255,194 A * 10/1993 Schaufelberger ..... B60T 8/1766
701/72
5,284,385 A * 2/1994 Muller ................. B60T 8/1766
303/113.5
(Continued)

FOREIGN PATENT DOCUMENTS

DE 19842315 A1 3/2000
DE 19954568 A1 * 5/2001 ............ B60T 13/683
(Continued)

OTHER PUBLICATIONS

Shraim, et al. "Estimation and Analysis of the Tire Pressure Effects on the Comportment of the Vehicle Center of Gravity", Jun. 5, 2006; International Workshop on Variable Structure Systems, 2006. VSS'06; p. 270-272; https://ieeexplore.ieee.org/document/1644529 (Year: 2006).*
(Continued)

*Primary Examiner* — Atul Trivedi
(74) *Attorney, Agent, or Firm* — Dickinson Wright PLLC

(57) ABSTRACT

A device and a method for decelerating a vehicle having a front-loading device has a brake system and sensors for measuring the mass and the center of gravity of a load. An electronic evaluation and control unit evaluates the sensor data to determine a maximum brake deceleration in forward travel, in order to prevent the vehicle tilting about the front axle. At least one sensor of the brake system generates a sensor signal in an emergency braking situation for triggering an emergency braking operation, in which the delimitation or reduction of the effective brake pressure in the wheel brake cylinders of the front axle is canceled and, with the exception of an ABS control operation, the full brake pressure is introduced in a controlled manner by way of a primary brake valve into the wheel brake cylinders of the front axle.

9 Claims, 2 Drawing Sheets

US 11,577,702 B2
Page 2

(51) Int. Cl.
*B60T 8/172* (2006.01)
*B60T 8/176* (2006.01)
*B66F 9/075* (2006.01)
*E02F 9/20* (2006.01)

(52) U.S. Cl.
CPC ........ *B66F 9/07509* (2013.01); *E02F 9/2083* (2013.01); *B60T 2210/32* (2013.01); *B60T 2230/04* (2013.01); *B60T 2250/00* (2013.01); *B60T 2250/02* (2013.01); *B60T 2270/10* (2013.01)

(58) Field of Classification Search
CPC .. B60T 8/265; B60T 2270/10; B60T 2210/32; B60T 13/662; B60T 13/686; B60T 2250/00; B60T 2250/02; B60T 17/22; B66F 17/003
USPC .......................................................... 701/50
See application file for complete search history.

(56) References Cited

U.S. PATENT DOCUMENTS

| | | | | |
|---|---|---|---|---|
| 5,324,102 | A * | 6/1994 | Roll | B60T 8/1706 303/9.62 |
| 5,445,443 | A * | 8/1995 | Hauser | B60T 8/1706 303/9.64 |
| 5,694,321 | A * | 12/1997 | Eckert | B60T 8/1755 701/84 |
| 2004/0158380 | A1 * | 8/2004 | Farber | B66F 17/003 340/440 |
| 2005/0057088 | A1 * | 3/2005 | Washington | B60T 8/176 303/69 |
| 2005/0110343 | A1 * | 5/2005 | Gronau | B60T 8/442 303/116.2 |
| 2006/0100766 | A1 * | 5/2006 | Schwarz | B62D 6/003 701/70 |
| 2006/0180372 | A1 * | 8/2006 | Mercier | B62K 5/027 303/146 |
| 2016/0121860 | A1 * | 5/2016 | Brown | B60T 7/04 701/70 |
| 2019/0016322 | A1 * | 1/2019 | Dieckmann | B60T 13/686 |
| 2021/0086623 | A1 * | 3/2021 | Yao | B60W 30/18172 |

FOREIGN PATENT DOCUMENTS

| | | | | |
|---|---|---|---|---|
| DE | 10156773 | A1 | 6/2003 | |
| DE | 10232639 | A1 | 2/2004 | |
| DE | 10304658 | A1 | 8/2004 | |
| DE | 102005011998 | A1 | 10/2005 | |
| DE | 102010036264 | A1 | 3/2012 | |
| DE | 102019113755 | A1 * | 11/2020 | ................ B60L 7/24 |
| DE | 102019113759 | A1 * | 11/2020 | ................ B60L 7/18 |
| EP | 3626485 | A1 * | 3/2020 | ........... B60G 11/265 |
| EP | 3750763 | A1 * | 12/2020 | ........... B60T 13/662 |
| JP | 2010188801 | A * | 9/2010 | |
| JP | 2010188852 | A * | 9/2010 | |
| WO | WO-9529830 | A1 * | 11/1995 | ........... B60T 13/686 |
| WO | WO-9713672 | A1 * | 4/1997 | ........... B60T 13/686 |
| WO | WO-9714593 | A1 * | 4/1997 | ........... B60T 13/686 |
| WO | WO-9964284 | A1 * | 12/1999 | ........... B60T 13/686 |
| WO | WO-2022105970 | A1 * | 5/2022 | |

OTHER PUBLICATIONS

Park, et al.; "An Integrated Observer for Real-Time Estimation of Vehicle Center of Gravity Height"; Apr. 29, 2020; IEEE Transactions on Intelligent Transportation Systems ( vol. 22, Issue: 9, Sep. 2021); pp. 5662-5668; https://ieeexplore.ieee.org/document/9082122 (Year: 2020).*

* cited by examiner

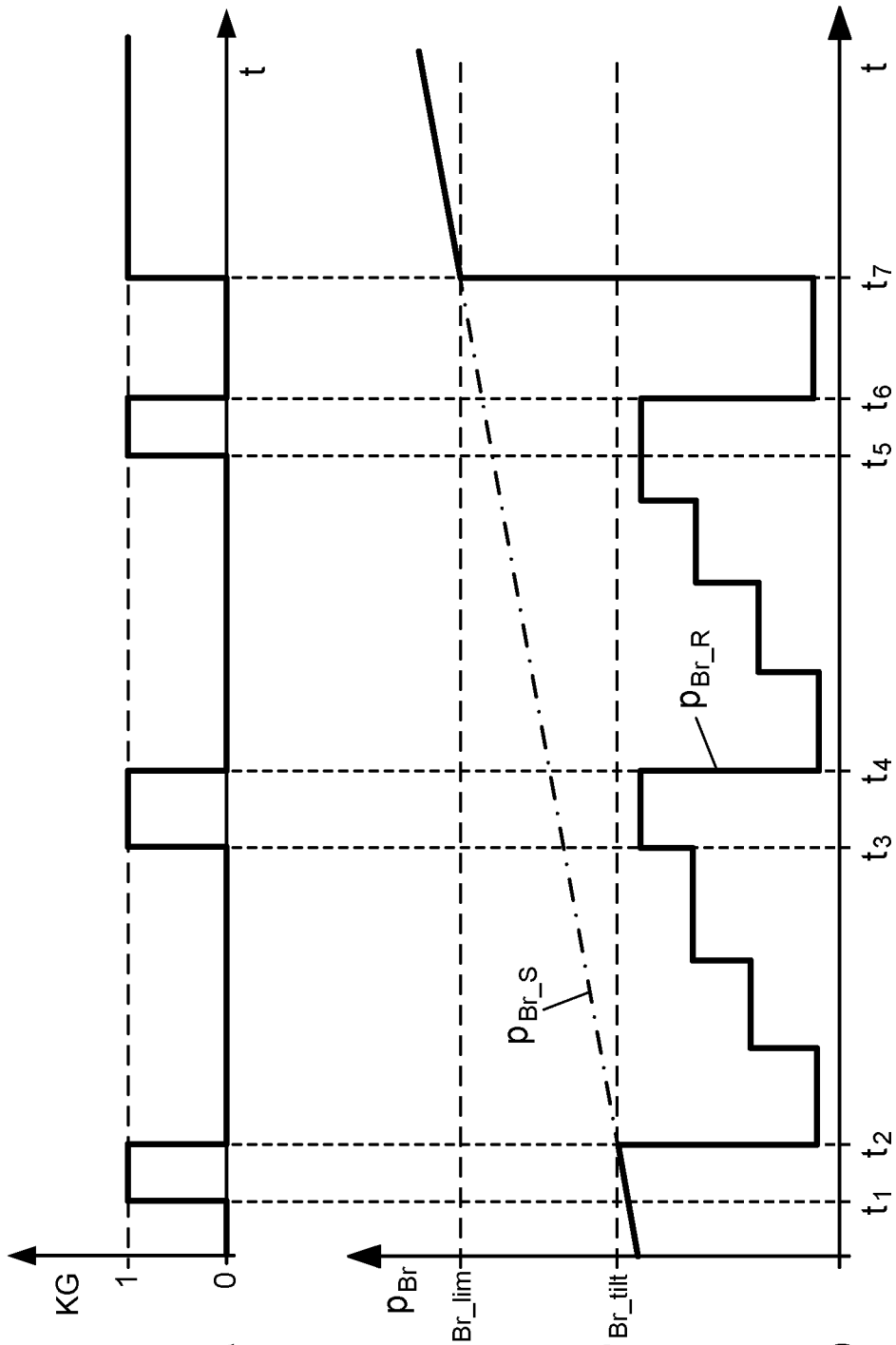

DEVICE AND METHOD FOR DECELERATING A VEHICLE HAVING A FRONT-LOADING DEVICE

TECHNICAL FIELD

The invention relates to a device and to a method for decelerating a vehicle having a front-loading device, for example an industrial truck, having sensors for measuring the mass as well as the position of the center of gravity of a received load, having an electronic evaluation and control unit for evaluating the sensor data as well as for determining a maximum braking deceleration in forward travel, in order to prevent the vehicle from tilting about the front axle, as well as having a hydraulic or pneumatic brake system which for delimiting or reducing the effective brake pressure in the wheel brake cylinders of the front axle is actuatable by the evaluation and control unit and is provided with an anti-lock brake system.

BACKGROUND

Industrial trucks such as forklift trucks, telescopic handling trucks, mechanical shovels, and agricultural tractors with front-end loaders receive loads to be conveyed by way of loading devices such as forks, shovels, and hooks on the vehicle front of the industrial trucks. The respective loading devices are fastened to masts which are displaceable in a horizontal and vertical manner, or to support arms which on the longitudinal side are adjustable and pivotable about a transverse axis. On account of the load received at the vehicle front, the overall center of gravity of the vehicle lies close to the front axle, as well as mostly also relatively high above the front axle. On account thereof, there is the risk, in particular in forward travel, that the vehicle when decelerating by virtue of the dynamic repositioning of the overall center of gravity tilts forward about the front axle. The risk of tilting of the vehicle depends on the mass of the received load as well as the horizontal and vertical position of the center of gravity of the load in terms of the front axle.

Numerous devices and control methods have already been proposed for avoiding tilting of an industrial truck. A device and a method for controlling the ride stability of an industrial truck, in particular of a forklift truck, by way of which the mass of a received load, the inclination of a mast, the lifting height of a fork, the tilting forces acting on the mast, as well as the accelerations effective in the longitudinal direction and the transverse direction are detected by sensor is known, for example, from DE 103 04 658 A1. Limit values for the lifting height of the fork, the travel speed, the travel acceleration, the steering angle, and the inclination of the mast are then established from the load data detected by sensor and from the characteristics of the vehicle, the limit values not being able to be exceeded on account of a corresponding delimitation of the control of the drive, the steering, the brakes, and the load. Full braking is prevented in an emergency function, when a front wheel is detected as tilting over a curb.

An industrial truck, in particular embodied as a forklift truck, having a control device in which data detected by sensor is processed for determining the current travel and load state is described in DE 10 2005 011 998 A1. The operating speed which is achievable or achieved, the start-up acceleration and braking acceleration as well as the travel speed are then reduced as a function of the determined travel and load state.

Moreover, devices and control methods by way of which tilting about the front axle when decelerating a vehicle, in particular a tractor unit without a semi-trailer, can be prevented are known from the on-road vehicle sector.

A method for decelerating a vehicle, in particular a tractor unit operated without a semi-trailer, is thus disclosed, for example, in DE 198 42 315 B4, in which method the axle load on the rear axle is continually detected by sensor and the absence of a semi-trailer is identified when an established axle load limit value is undershot. In the case of an absent semi-trailer, the brake pressure in the wheel brake cylinders of the front axle in forward travel is lowered, and the maximum braking deceleration is reduced on account thereof. The lowering of the brake pressure in the wheel brake cylinders of the front axle takes place by correspondingly actuating the assigned ABS control valves.

A device and a control method of an ABS brake system of a vehicle, in particular of a tractor unit, in which the current load and loaded state is determined and a maximum permissible brake pressure in the wheel brake cylinders of the front axle is calculated therefrom, by way of which tilting about the front axle is to be prevented when decelerating the vehicle in forward travel are known from DE 101 56 773 A1. The delimitation of the brake pressure in the wheel brake cylinders of the front axle takes place by correspondingly actuating the assigned ABS control valves.

It is thus known that tilting about the front axle when decelerating the vehicle in forward travel can be prevented by determining the loading and travel state of the respective vehicle as well as by a delimitation or reduction of the maximum brake pressure in the wheel brake cylinders of the front axle as a function of the loading and travel state. The brake pressure in the respective wheel brake cylinders in a hydraulic or pneumatic brake system provided with an anti-lock brake system (ABS) herein is expediently delimited or reduced by correspondingly actuating the assigned ABS control valves.

However, travel situations in which the tilting of the vehicle about the front axle are of lesser concern in comparison with a crash with another vehicle or a collision with a pedestrian, and is therefore considered preferable to tilt-prevention by the driver, are also possible.

SUMMARY

The present disclosure presents a device and a method for decelerating a vehicle of the type mentioned at the outset, by way of which the vehicle in an emergency braking situation can be decelerated by the maximum possible braking deceleration, despite a tilt-prevention function being present.

Accordingly, the invention first relates to a device for decelerating a vehicle having a front-loading device, for example an industrial truck, having sensors for measuring the mass as well as the position of the center of gravity of a received load, having an electronic evaluation and control unit for evaluating the sensor data as well as for determining a maximum braking deceleration in forward travel, in order to prevent the vehicle from tilting about the front axle, as well as having a hydraulic or pneumatic brake system which for delimiting or reducing the effective brake pressure in the wheel brake cylinders of the front axle is actuatable by the evaluation and control unit and is provided with an anti-lock brake system.

According to the invention it is provided in this device that at least one such sensor that is disposed on the brake system is provided, the sensor signal of the at least one sensor in an emergency braking situation being identifiable by the evaluation and control unit, and that the evaluation and control unit is configured and specified in such a manner that, upon an emergency braking situation being identified, such an emergency braking situation is activatable and controllable by the evaluation and control unit by way of which the delimitation or reduction of the effective brake pressure in the wheel brake cylinders of the front axle is canceled and, with the exception of an ABS control operation, the full brake pressure introduced in a controlled manner by way of a primary brake valve prevails in the wheel brake cylinders of the front axle.

When an emergency braking situation is identified via the sensor signal of the at least one sensor when decelerating the vehicle during forward travel, the available tilt-prevention function, by way of which tilting of the vehicle about the front axle but also the maximum potential braking deceleration is prevented, is accordingly deactivated. The driver can thus decelerate the vehicle with the maximum braking deceleration while taking into account potential tilting about the front axle, and thus prevent, for example, a crash with another vehicle or the collision with a pedestrian.

The sensor for identifying an emergency braking situation can be configured as a distance sensor which is disposed on the primary brake valve, and via which an emergency braking situation is identifiable by a predefined limit actuation travel $s_{Br\_lim}$ of a control piston being reached or achieved.

A sensor which for identifying an emergency braking situation is provided alternatively or additionally to the distance sensor disposed on the primary brake cylinder can also be configured as a pressure sensor which is connected to a primary brake line that is disposed between the primary brake valve and an ABS control valve of the front axle, and via which an emergency braking situation is identifiable by a predefined limit brake pressure $p_{Br\_lim}$ being reached or exceeded.

Furthermore, a manually activatable button via which the emergency braking function is manually triggerable by the driver of the vehicle can be present.

As mentioned, the invention also relates to a method for decelerating a vehicle having a front-loading device, for example an industrial truck. In this method, the mass as well as the position of the center of gravity of a received load are first determined by sensor. The sensor data is subsequently evaluated and, for avoiding tilting of the vehicle about the front axle, a maximum braking deceleration in forward travel is determined. Thereupon, a hydraulic or pneumatic brake system that is provided with an anti-lock brake system ABS is actuated in such a manner that the effective brake pressure $p_{Br\_R}$ in the wheel brake cylinders of the front axle is delimited or reduced.

According to the invention, it is additionally provided in this method that via the sensor signal of at least one sensor that is disposed on the brake system, an emergency braking situation is identified when reaching or exceeding a predefined limit value, and that, upon identifying such an emergency braking situation, an emergency braking function by way of which the delimitation or reduction of the effective brake pressure in the wheel brake cylinders of the front axle is canceled is activated and controlled such that, with the exception of an ABS control operation, the full brake pressure $p_{Br\_S}$ introduced in a controlled manner by way of a primary brake valve prevails in the wheel brake cylinders of the front axle.

The presence of an emergency braking situation can be identified by the evaluation of the sensor signal of a distance sensor which is disposed on the primary brake cylinder when the actuation travel $s_{Br\_S}$ of a control piston detected by sensor has reached or exceeded $s_{Br\_S} \geq s_{Br\_lim}$ a predefined limit actuation travel $s_{Br\_lim}$.

Alternatively or additionally thereto, the presence of an emergency braking situation can also be identified by the evaluation of the sensor signal of a pressure sensor which is connected to a primary brake line that is disposed between the primary brake valve and an ABS control valve of the front axle, as long as the brake pressure $p_{Br\_S}$ detected by sensor has reached or exceeded $p_{Br\_S} \geq p_{Br\_lim}$ a predefined limit brake pressure $p_{Br\_lim}$.

It can finally be provided according to the method that an airbag available in the vehicle and/or a belt tensioner of a safety belt system are/is activated by the activation of the emergency braking function. On account thereof, the driver of the vehicle himself/herself can be protected when the driver decides to allow the vehicle to tilt about the front axle so as to avoid any harm to a potential uninvolved third-party.

The invention will be explained in more detail hereunder by the example of an embodiment illustrated in the appended drawings.

BRIEF DESCRIPTION OF THE DRAWINGS

In the drawings:

FIG. 2a shows a first part of a two-part diagram for visualizing the sequence of the method according to the invention for decelerating a vehicle; and FIG. 2b shows a second part of the two-part diagram for visualizing the sequence of the method according to the invention for decelerating a vehicle.

DETAILED DESCRIPTION OF THE DRAWINGS

Figure 1:
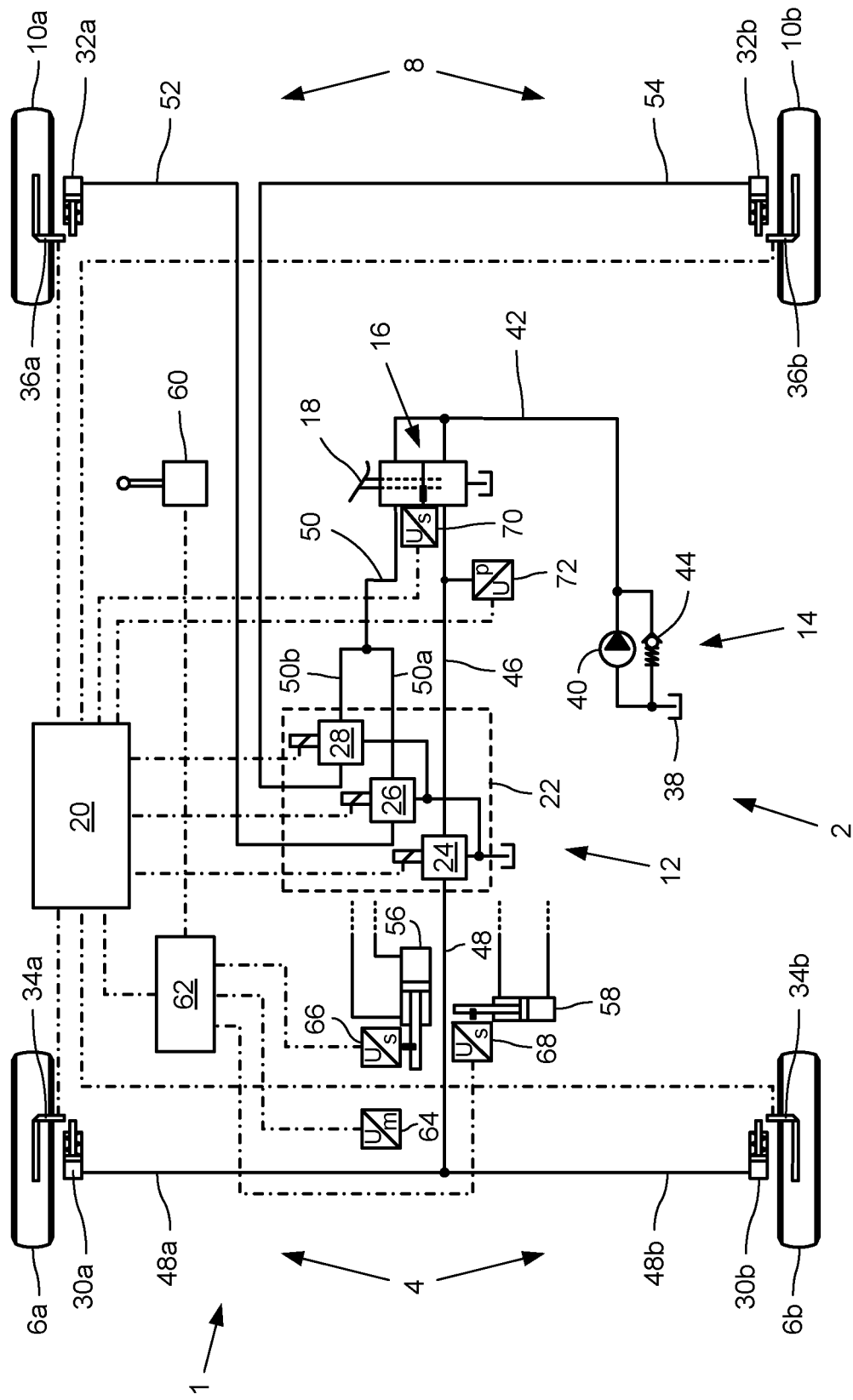
FIG. 1 shows a device according to the invention for decelerating a vehicle in a schematic illustration.

The vehicle 2 which is schematically illustrated in FIG. 1 and includes the device 1 according to the invention is in an exemplary manner an industrial truck having a front-loading device, in particular a telescopic handling truck having a telescopic lifting arm (not illustrated in more detail), to the front end of which a load can be fastened. The vehicle 2 is configured as a dual-track vehicle and has a front axle 4 and a rear axle 8, each having two vehicle wheels 6a, 6b; 10a, 10b. The vehicle 2 is equipped with a hydraulic brake system 12 which is provided with an anti-lock brake system (ABS). The brake system 12 comprises a pressure supply device 14, a primary brake valve 16 activatable by means of a brake pedal 18, an electronic brake control unit 20, an ABS valve block 22 containing three ABS control valve 24, 26, 28, as well as four wheel brake cylinders 30a, 30b; 32a, 32b and four revolution sensors 34a, 34b; 36a, 36b which are in each case disposed on one vehicle wheel 6a, 6b; 10a, 10b of the vehicle axles 4, 8.

The pressure supply device 14 has an oil pump 40 by means of which hydraulic fluid from a collection vessel 38 is conveyable into a supply line 42. A check valve 44 which opens in the return-flow direction and is effective as a pressure control valve is connected in parallel with the oil pump 40. The primary brake valve 16 embodied as a dual-channel brake valve is connected to the supply line 42 that branches out at the end of the latter.

A primary brake line 46 of the front axle 4 is connected to the output of the first channel of the primary brake valve 16, the primary brake line 46 by way of the first ABS control valve 24 of the ABS valve block 22 and an axle brake line 48, 48a, 48b that branches out at the end of the latter being connected, or able to be connected, respectively, to the wheel brake cylinders 30a, 30b of the front axle 4.

A primary brake line 50, 50a, 50b of the rear axle 8, the former branching out at the end thereof, is connected to the output of the second channel of the primary brake valve 16, the first line branch 50a of the primary brake line 50 by way of the second ABS control valve 26 of the ABS valve block 22 and a first wheel brake line 52 being connected, or able to be connected, respectively, to the wheel brake cylinder 32a of the right vehicle wheel 10a of the rear axle 8, and the second line branch 50b of the primary brake line 50 by way of the third ABS control valve 28 of the ABS valve block 22 and a second wheel brake line 54 being connected, or able to be connected, respectively, to the wheel brake cylinder 32b of the left vehicle wheel 10b of the rear axle 8.

The ABS controlling takes place in a manner known per se by way of the brake control unit 20 which to this end by way of electric sensor lines is connected to the revolution sensors 34a, 34b; 36a, 36b disposed on the vehicle wheels 6a, 6b; 10a, 10b, and by way of electric control lines (not provided with reference signs) is connected to the ABS control valves 24, 26, 28.

The brake system 12 has a first brake circuit for the front axle 4, the first brake circuit comprising the primary brake line 46, the first ABS control valve 24, and the axle brake line 48 having the line branches 48a, 48b. The ABS controlling of the wheel brakes on the front axle 4 thus does not take place in a wheel-selective but a collective manner. The brake system 12 for the rear axle 8 has a second brake circuit which comprises the primary brake line 50 having the line branches 50a, 50b, the second ABS control valve 26, and the third ABS control valve 28, as well as the two wheel brake lines 52, 54. The ABS controlling of the wheel brakes on the rear axle 8 thus takes place in a wheel-selective manner.

The telescopic lifting arm of the vehicle 2, in terms of the length of the former, is adjustable by means of a first hydraulic actuator cylinder 56, and is pivotable about a transverse axis by means of a second hydraulic actuator cylinder 58. The two actuating cylinders 56, 58 are actuatable by the driver by means of a control panel 60 which by way of at least one electric control line is connected to an electronic load control unit 62. At least two magnetic valves (not illustrated in more detail) per actuator cylinder 56, 58 are actuated by the load control unit 62 in such a manner that the pressurized chambers of the actuator cylinders 56, 58 for implementing the control commands entered by way of the control panel 60 are filled with hydraulic fluid or emptied into a collection vessel.

A weight sensor 64, which is connected to the load control unit 62 by way of an electric sensor line (not referred to in more detail), for measuring the mass of a received load is disposed on the outer end of the telescopic lifting arm. A first distance sensor 66, which is connected to the load control unit 62 by way of an electric sensor line (likewise not referred to in more detail), for measuring the length of the telescopic lifting arm is disposed on the first actuator cylinder 56. A second distance sensor 68, which is likewise connected to the load control unit 62 by way of an electric sensor line, for measuring the pivot height, or the pivot angle, of the telescopic lifting arm is disposed on the second actuator cylinder 58. The mass and the position of the center of gravity of the load received by the vehicle 2 are determined from the sensor signals of the sensors 64, 66, 68, and the values are transmitted to the brake control unit 20 by way of a data line. The load control unit 62 and the brake control unit 20 in terms of construction can also be combined in one common control unit.

A tilt-prevention function in the form of a control software, by way of which the effective brake force in the wheel brakes of the front axle 4 is delimited or reduced as a function of the mass and the position of the center of gravity of the received load during braking of the vehicle 2 in forward travel, so as to prevent tilting of the vehicle 2 about the front axle 4, is stored in the brake control unit 20. The delimitation or reduction of the brake force on the front axle 4 takes place by way of a corresponding actuation of the first ABS control valve 24, by way of which the effective brake pressure in the wheel brake cylinders 30a, 30b of the front axle 4 is the limited or reduced.

In order to enable the driver to be able to decelerate the vehicle with the maximum braking deceleration in an emergency braking function, despite the braking deceleration being reduced by the tilt-prevention function, a third distance sensor 70 by means of which the actuation travel $s_{Br\_S}$ of an actuator piston which is displaceable by means of the brake pedal 18 is measured is disposed on the primary brake valve 16. As can be seen, the third distance sensor 70 is connected to the brake control unit 20 by way of an electric sensor line. Additionally, a pressure sensor 72 is connected to the primary brake line 46 of the front axle 4 for this purpose, the brake pressure $p_{Br\_S}$ introduced in a controlled manner by way of the brake pedal 18 being measured by means of the pressure sensor 72, and the latter being connected to the brake control unit 20 by way of an electric sensor line.

When the actuation travel $s_{Br\_S}$ detected by sensor of the actuator piston of the primary brake valve 16 reaches or exceeds a predefined limit actuation travel $s_{Br\_lim}$, and/or the brake pressure $p_{Br\_S}$ detected by sensor in the primary brake line 46 of the front axle 4 reaches or exceeds a predefined limit brake pressure $p_{Br\_lim}$, the delimitation or reduction of the effective brake pressure $p_{Br\_R}$ in the wheel brake cylinders 30a, 30b of the front axle 4 is canceled. On account thereof, with the exception of an ABS control operation, the full brake pressure $p_{Br\_S}$ introduced in a controlled manner by way of the primary brake valve 16 prevails in the wheel brake cylinders 30a, 30b of the front axle 4 such that the vehicle 2 in this instance is decelerated with the maximum possible brake deceleration. A crash with another vehicle, or the collision with a pedestrian, can be prevented by way of emergency braking of this type, wherein potential tilting of the vehicle 2 about the front axle 4 is taken into account.

The control sequence of an emergency braking function of this type is visualized in the two part-diagrams of FIGS. 2a and 2b. In the upper part-diagram according to FIG. 2a, the tilting risk KG about the front axle 4, determined by the evaluation of the sensor data during the deceleration of the vehicle 2, is illustrated over time t, wherein a non-existent tilting risk is identified by KG=0, and an existing tilting risk is identified by KG=1.

In the lower part-diagram according to FIG. 2b, the brake pressure $p_{Br\_S}$ introduced in a controlled manner into the primary brake line 46 of the front axle 4 by way of the primary brake valve 16 and measured by means of the pressure sensor 72, as well as the brake pressure $p_{Br\_R}$ introduced in a controlled manner into the axle brake line 48 by way of the ABS control valve 24 and thus prevailing in the wheel brake cylinders 30a, 30b of the front axle 4, are plotted over time t.

The vehicle 2 in the situation assumed here is in forward travel and is decelerated by the driver by activating the brake pedal 18.

On account thereof, the brake pressure $p_{Br\_S}$ introduced in a controlled manner into the primary brake line 46 of the front axle 4 by way of the primary brake valve 16 steadily increases by virtue of an increasing actuation force on the brake pedal 18 and an increasing actuation travel of the brake pedal 18. As the brake pressure $p_{Br\_S}$ approaches a critical tilting brake pressure $p_{Br\_tilt}$ which has been determined from the mass by sensor and the position of the center of gravity of a received load as well as from vehicle-specific parameters of the vehicle 2, an existing tilting risk KG is identified at the temporal point $t_1$, and the brake pressure $p_{Br\_R}$ prevailing in the wheel brake cylinders 30a, 30b of the front axle 4 at the temporal point $t_2$ is lowered by correspondingly actuating the assigned ABS control valve 24.

Subsequently, the effective brake pressure $p_{Br\_R}$ in the wheel brake cylinders 30a, 30b of the front axle 4 is increased in stages until a tilting risk KG is again identified when approaching the tilting brake pressure $p_{Br\_tilt}$ at the temporal point $t_3$. Thereafter, the brake pressure $p_{Br\_R}$ is again lowered at the temporal point $t_4$ and is again increased in stages until a tilting risk KG is yet again identified when approaching the tilting brake pressure $p_{Br\_tilt}$ at the temporal point $t_5$. Subsequently, the brake pressure $p_{Br\_R}$ is again lowered at the temporal point $t_6$, but at the temporal point $t_7$ is finally increased up to the brake pressure $p_{Br\_S}$ introduced in a controlled manner by way of the primary brake valve 16, because the latter at the temporal point $t_7$ has reached a predefined limit brake pressure $p_{Br\_lim}$.

An emergency braking situation is identified as the brake pressure $p_{Br\_S}$ introduced in a controlled manner reaches or exceeds the limit brake pressure $p_{Br\_lim}$, and an emergency braking function in which the delimitation or reduction of the effective brake pressure $p_{Br\_R}$ in the wheel brake cylinders 30a, 30b of the front axle 4 is canceled is activated. On account thereof, with the exception of an ABS control operation, the full brake pressure $p_{Br\_S}$ introduced in a controlled manner by way of the primary brake valve 16 prevails in the wheel brake cylinders 30a, 30b of the front axle 4, such that the vehicle 2 can be decelerated with the maximum possible braking deceleration, and a crash with another vehicle, or the collision with a pedestrian, for example, can thus be prevented. Potential tilting of the vehicle 2 about the front axle 4 herein is however taken into account, since this has been considered less disadvantageous by the driver of the vehicle 2. The triggering of the emergency braking function can also be performed by the driver by activating an emergency button. An airbag on the vehicle 2 for the driver can be triggered, and/or a belt tensioner of a safety belt can be set in function independently of the types of activation mentioned.

While the above description constitutes the preferred embodiments of the present invention, the invention is susceptible to modification, variation and change without departing from the proper scope and fair meaning of the accompanying claims.

LIST OF REFERENCE SIGNS

1 Device for decelerating a vehicle
2 Vehicle
4 Front axle
6a, 6b First vehicle wheel, second vehicle wheel
8 Rear axle
10a, 10b Third vehicle wheel, fourth vehicle wheel
12 Brake system
14 Pressure supply device
16 Primary brake valve
18 Brake pedal
20 Brake control unit
22 ABS valve block
24 First ABS control valve
26 Second ABS control valve
28 Third ABS control valve
30a, 30b First wheel brake cylinder, second wheel brake cylinder
32a, 32b Third wheel brake cylinder, fourth wheel brake cylinder
34a, 34b First revolution sensor, second revolution sensor
36a, 36b Third revolution sensor, fourth revolution sensor
38 Collection vessel
40 Oil pump
42 Supply line
44 Check valve
46 Primary brake line
48 Axle brake line
48a, 48b Line branches of the axle brake line
50 Primary brake line
50a, 50b Line branches of the primary brake line 50
52 First wheel brake line
54 Second wheel brake line
56 First actuator cylinder
58 Second actuator cylinder
60 Control panel
62 Load control unit
64 Weight sensor
66 First distance sensor
68 Second distance sensor
70 Third distance sensor
72 Pressure sensor
ABS Anti-lock brake system
KG Tilting risk
$p_{Br}$ Brake pressure
$p_{Br\_S}$ Brake pressure introduced in a controlled manner (detected by sensor)
$p_{Br\_lim}$ Limit brake pressure
$p_{Br\_R}$ Brake pressure, wheel brake pressure
$p_{Br\_tilt}$ Tilting brake pressure
$s_{Br}$ Actuation travel of a control piston of the primary brake valve
$s_{Br\_S}$ Actuation travel (detected by sensor)
$s_{Br\_lim}$ Limit actuation travel
t Time
$t_1$-$t_7$ Temporal points

The invention claimed is:

1. A device (1) for decelerating a vehicle (2) having a front-loading device and a front axle, the device comprising:
sensors (64, 66, 68) for measuring the mass the center of gravity of a received load, the sensors generating sensor data,
an electronic evaluation and control unit (20, 62) configured to evaluate the sensor data to determine a maximum brake deceleration ($p_{Br\_tilt}$) in forward travel, in order to prevent tilting of the vehicle (2) about the front axle (4),
a hydraulic or pneumatic brake system (12) configured to be actuated by the evaluation and control unit (20, 62) to effect a delimitation or reduction of an effective brake pressure ($p_{Br\_R}$) in wheel brake cylinders (30a, 30b) of the front axle (4), the brake system including an anti-lock brake system (ABS), wherein at least one sensor (70, 72) of the brake system (12) generates a sensor signal in an emergency braking situation, the sensor signal being identifiable by the evaluation and control unit (20, 62),
wherein the electronic evaluation and control unit (20, 62) is configured, upon identification of the emergency braking situation, to activate and control an emergency braking operation by canceling the delimitation or reduction of the effective brake pressure ($p_{Br\_R}$) in the wheel brake cylinders (30a, 30b) of the front axle (4) and, with the exception of an anti-lock control operation, to cause an introduction of a full brake pressure ($p_{Br\_S}$) in a controlled manner by way of a primary brake valve (16) into the wheel brake cylinders (30a, 30b) of the front axle (4).

2. The device as claimed in claim 1, wherein the sensor (70) for identifying the emergency braking situation is a travel sensor which is disposed on the primary brake valve (16), the emergency braking situation being identified by a predefined limit actuation travel ($s_{Br\_lim}$) of a control piston being reached or exceeded.

3. The device as claimed in claim 1, wherein the sensor (72) for identifying the emergency braking situation is a pressure sensor connected to a primary brake line (46) disposed between the primary brake valve (16) and an ABS control valve (24) of the front axle (4), the emergency braking situation being identified when a predefined limit brake pressure ($p_{Br\_lim}$) is reached or exceeded.

4. The device as claimed in claim 1, further comprising a manually activatable switch configured for manually triggering the emergency braking operation by a driver of the vehicle.

5. A method for decelerating a vehicle (2) having a front axle and a front-loading device, the method comprising the following steps:
   determining a mass and a center of gravity of a received load by using a sensor generating sensor data,
   evaluating the sensor data and determining a maximum braking deceleration in forward travel from the sensor data for avoiding tilting of the vehicle (2) about the front axle (4), actuating a hydraulic or pneumatic brake system (12) equipped with an anti-lock brake system (ABS) configured to effect a delimitation or reduction of an effective brake pressure ($p_{Br\_R}$) in wheel brake cylinders (30a, 30b) of the front axle (4),
   identifying, based on a sensor signal of a sensor (70, 72) of the hydraulic or pneumatic brake system (12), an emergency braking situation when the sensor signal reaches or exceeds a predefined limit value, and,
   upon identifying the emergency braking situation, activating an emergency braking operation that cancels the delimitation or reduction of the effective brake pressure ($p_{Br\_R}$) in the wheel brake cylinders (30a, 30b) of the front axle (4);
   controlling the emergency braking operation such that, with the exception of an anti-lock brake control operation, a full brake pressure ($p_{Br\_S}$) is introduced in a controlled manner by way of a primary brake valve (16) into the wheel brake cylinders (30a, 30b) of the front axle (4).

6. The method as claimed in claim 5, wherein the emergency braking situation is identified by evaluating a sensor signal of a distance sensor (71) disposed on the primary brake valve (16) when an actuation travel ($s_{Br\_S}$) of a control piston detected by the distance sensor has reached or exceeded ($s_{Br\_S} \geq s_{Br\_lim}$) a predefined limit actuation travel ($s_{Br\_lim}$).

7. The method as claimed in claim 5, wherein the emergency braking situation is identified by evaluating a sensor signal of a pressure sensor (72) connected to a primary brake line (46) disposed between the primary brake valve (16) and an ABS control valve (24) of the front axle (4), wherein the emergency braking situation is identified when a brake pressure ($p_{Br\_S}$) detected by the pressure sensor has reached or exceeded ($p_{Br\_S} \geq p_{Br\_lim}$) predefined limit brake pressure ($p_{Br\_lim}$).

8. The method as claimed in claim 5, further comprising the step of activating at least one of an airbag and a belt tensioner of a safety belt system simultaneously with activating the emergency braking operation.

9. A device (1) for decelerating a vehicle (2) having a front-loading device and a front axle, the device comprising:
   sensors (64, 66, 68) for measuring a mass and a center of gravity of a received load at the vehicle, wherein the sensors measure the mass and center of gravity of the load received at the vehicle and generate corresponding sensor data,
   an electronic evaluation and control unit (20, 62) that evaluates the generated sensor data and, based on the generated sensor data, determines a maximum brake deceleration ($p_{Br\_tilt}$) in forward travel that prevents tilting of the vehicle (2) about the front axle (4),
   a hydraulic or pneumatic brake system (12) that is actuated by the evaluation and control unit (20, 62) and that limits an effective brake pressure ($p_{Br\_R}$) in wheel brake cylinders (30a, 30b) of the front axle (4) based on the maximum brake deceleration determined by the control unit, the brake system including an anti-lock brake system (ABS), wherein at least one sensor (70, 72) of the brake system (12) generates an emergency signal in an emergency braking situation,
   wherein the electronic evaluation and control unit (20, 62) receives and identifies the emergency signal and activates and controls an emergency braking operation;
   wherein, in the emergency braking operation, the electronic evaluation and control unit cancels the limit on the effective brake pressure ($p_{Br\_R}$) in the wheel brake cylinders (30a, 30b) of the front axle (4) and,
   wherein, in the emergency braking operation, the electronic evaluation and control unit causes an introduction of a full brake pressure ($p_{Br\_S}$), with the exception of an anti-lock control operation, in a controlled manner by way of a primary brake valve (16) into the wheel brake cylinders (30a, 30b) of the front axle (4).

\* \* \* \* \*